United States Patent
Patton et al.

(10) Patent No.: US 10,376,071 B2
(45) Date of Patent: Aug. 13, 2019

(54) LEANING CHAIR

(71) Applicant: Varidesk, LLC, Coppell, TX (US)

(72) Inventors: David Patton, Flower Mound, TX (US); Lio Yenwei Chang, Lewisville, TX (US)

(73) Assignee: Variadesk, LLC, Coppell, TX (US)

( * ) Notice: Subject to any disclaimer, the term of this patent is extended or adjusted under 35 U.S.C. 154(b) by 220 days.

(21) Appl. No.: 15/362,324

(22) Filed: Nov. 28, 2016

(65) Prior Publication Data

US 2018/0146789 A1 May 31, 2018

(51) Int. Cl.
| | | |
|---|---|---|
| A47C 3/20 | (2006.01) | |
| A47C 7/00 | (2006.01) | |
| A47C 7/02 | (2006.01) | |
| A47C 9/02 | (2006.01) | |
| F16C 11/04 | (2006.01) | |

(52) U.S. Cl.
CPC ............ *A47C 9/025* (2013.01); *A47C 3/20* (2013.01); *A47C 7/00* (2013.01); *A47C 7/004* (2013.01); *A47C 7/025* (2013.01); *F16C 11/04* (2013.01); *F16C 2314/70* (2013.01)

(58) Field of Classification Search
CPC ............ A47C 9/025; A47C 3/20; A47C 7/00; A47C 7/004; A47C 7/025; F16C 11/04
USPC ...................................... 297/451.5
See application file for complete search history.

(56) References Cited

U.S. PATENT DOCUMENTS

| | | |
|---|---|---|
| 2,620,863 A | 12/1952 | Cooper |
| 2,678,684 A | 5/1954 | Thomson |
| 2,785,735 A | 3/1957 | Banks |
| 3,181,828 A | 5/1965 | Cramer |
| 3,203,657 A | 8/1965 | Thompson |
| 3,312,437 A | 4/1967 | Barth |
| 3,414,323 A | 12/1968 | Mitchum |
| 4,029,278 A | 6/1977 | Napoleon |
| 4,130,263 A | 12/1978 | Roericht |
| 4,148,523 A | 4/1979 | Brand et al. |
| 4,183,579 A | 1/1980 | Gonzalez y. Rojas |
| D261,450 S | 10/1981 | Jenkins |
| 4,433,870 A | 2/1984 | Bairen et al. |
| D275,155 S | 8/1984 | Carlin |
| 4,469,372 A | 9/1984 | Long |

(Continued)

FOREIGN PATENT DOCUMENTS

WO  WO-2014174227 A1  10/2014

OTHER PUBLICATIONS

International Search Report and Written Opinion of the International Searching Authority in International Application No. PCT/US2017/063431, dated Feb. 2, 2018.

*Primary Examiner* — Anthony D Barfield
(74) *Attorney, Agent, or Firm* — Venable LLP; Michele V. Frank (57) ABSTRACT

A leaning chair can include a base defining a lower surface that rests on a floor, the base including a support surface; a shaft coupled to the base, the shaft defining a first end and a second end; a flexible mount coupling the first end of the shaft to the base, the shaft extending through the mount; a pivot pin located underneath the mount, the first end of the shaft resting on the pivot pin, and being configured to be housed inside the mount, the pivot pin being configured to pivot on the support surface; and a user support member coupled to the second end of the shaft.

25 Claims, 10 Drawing Sheets

(56) References Cited

U.S. PATENT DOCUMENTS

| | | | |
|---|---|---|---|
| 4,526,422 A | 7/1985 | Mengshoel et al. |
| D283,856 S | 5/1986 | Elmaleh |
| 4,650,249 A | 3/1987 | Serber |
| 4,653,808 A | 3/1987 | Opsvik |
| 4,738,487 A | 4/1988 | Shalinsky et al. |
| 4,863,178 A | 9/1989 | Friesen |
| 4,865,382 A | 9/1989 | Marshall |
| 4,867,273 A | 9/1989 | Schaevitz |
| 4,930,839 A | 6/1990 | Saito et al. |
| 4,932,719 A | 6/1990 | Gonzalez y. Rojas |
| 4,934,638 A | 6/1990 | Davis |
| 5,010,621 A | 4/1991 | Bock |
| 5,149,174 A | 9/1992 | Charash |
| 5,199,763 A | 4/1993 | Wilder et al. |
| 5,295,728 A | 3/1994 | Schaevitz |
| 5,328,240 A | 7/1994 | Neumuller |
| D365,695 S | 1/1996 | Sibbitt, Sr. |
| 5,494,333 A | 2/1996 | Wilson |
| 5,511,855 A | 4/1996 | Miles |
| 5,524,968 A | 6/1996 | Stoltz |
| 5,700,201 A | 12/1997 | Bellows et al. |
| 5,702,158 A | 12/1997 | Mengshoel et al. |
| 5,720,517 A | 2/1998 | Prothro, Sr. |
| 5,909,925 A | 6/1999 | Glockl |
| 5,921,628 A | 7/1999 | Glockl |
| 6,017,089 A | 1/2000 | Mengshoel |
| 6,030,045 A | 2/2000 | Hoshino |
| 6,062,638 A | 5/2000 | Ferguson |
| 6,065,808 A | 5/2000 | Tinsley |
| 6,123,392 A | 9/2000 | Alfred et al. |
| 6,135,557 A | 10/2000 | Gustafsson |
| 6,155,646 A | 12/2000 | Sisson |
| 6,305,674 B1 | 10/2001 | Koivurova |
| D473,389 S | 4/2003 | Ryan |
| 6,601,818 B1 | 8/2003 | Larsen |
| 6,672,660 B2 | 1/2004 | Hoshino |
| 6,698,831 B2 | 3/2004 | Lloyd |
| 6,893,097 B1 | 5/2005 | Ebensperger et al. |
| D522,261 S | 6/2006 | Whiteside et al. |
| 7,100,983 B1 | 9/2006 | Gant |
| 7,108,321 B2 | 9/2006 | Davis |
| 7,144,080 B2 | 12/2006 | Lloyd |
| 7,234,781 B2 | 6/2007 | Liao |
| 7,303,516 B2 | 12/2007 | Petersen |
| 7,314,248 B2 | 1/2008 | Mabon et al. |
| 7,322,913 B2 | 1/2008 | Gates |
| 7,328,951 B2 | 2/2008 | Ward et al. |
| 7,401,856 B2 | 7/2008 | Marchand et al. |
| 7,552,966 B2 | 6/2009 | Crowell |
| D598,209 S | 8/2009 | Lippert et al. |
| 7,591,773 B2 | 9/2009 | Weir et al. |
| 7,624,737 B2 | 12/2009 | Klemm |
| 7,669,920 B1 | 3/2010 | Petersen et al. |
| 7,703,726 B2 | 4/2010 | Harrison et al. |
| 7,726,729 B2 | 6/2010 | Groll |
| 7,740,308 B2 | 6/2010 | Mishly |
| 8,066,624 B1 | 11/2011 | Stroup |
| 8,136,876 B2 | 3/2012 | Bellvis Castillo et al. |
| 8,151,812 B2 | 4/2012 | Razon |
| 8,220,872 B2 | 7/2012 | Hong |
| D666,425 S | 9/2012 | Link |
| 8,317,267 B2 | 11/2012 | Wallace |
| 8,403,408 B2 | 3/2013 | Hosler |
| 8,496,292 B2 | 7/2013 | Strassberg |
| 8,540,314 B2 | 9/2013 | Fernandez |
| D697,328 S | 1/2014 | Keen et al. |
| 8,696,059 B2 | 4/2014 | Carmichael, IV |
| 8,726,814 B1 | 5/2014 | Matteo |
| 8,845,017 B1 | 9/2014 | Lach |
| D716,570 S | 11/2014 | Keen et al. |
| 8,973,997 B2 | 3/2015 | Green et al. |
| 9,016,796 B2 | 4/2015 | Portis |
| D741,073 S | 10/2015 | Keen et al. |
| D746,076 S | 12/2015 | Figueras Mitjans |
| D750,391 S | 3/2016 | Lensing |
| 9,301,619 B2 | 4/2016 | Verdier et al. |
| 9,763,520 B1* | 9/2017 | Pan ................. A47C 1/03255 |
| 9,861,202 B2* | 1/2018 | Qi ................... A47C 3/0255 |
| 2003/0151277 A1 | 8/2003 | Chen |
| 2004/0189071 A1 | 9/2004 | Komura et al. |
| 2004/0212238 A1 | 10/2004 | Chen |
| 2006/0082206 A1 | 4/2006 | Travis |
| 2006/0138840 A1 | 6/2006 | Keilhauer et al. |
| 2006/0232109 A1 | 10/2006 | Olano |
| 2008/0106132 A1 | 5/2008 | Glockl et al. |
| 2008/0143164 A1 | 6/2008 | Ghilzai |
| 2009/0001788 A1 | 1/2009 | Lenz et al. |
| 2009/0174232 A1 | 7/2009 | Hoffman |
| 2009/0230743 A1 | 9/2009 | Derakhshan et al. |
| 2011/0160026 A1 | 6/2011 | Perez, Jr. |
| 2011/0175414 A1 | 7/2011 | Asbjornsen |
| 2012/0013162 A1 | 1/2012 | Chen |
| 2012/0158138 A1 | 6/2012 | Brinkerhoff et al. |
| 2012/0319444 A1 | 12/2012 | Onopa |
| 2013/0026335 A1 | 1/2013 | Lopopolo |
| 2013/0031712 A1 | 2/2013 | Gossett et al. |
| 2013/0306831 A1 | 11/2013 | Keen et al. |
| 2013/0307298 A1 | 11/2013 | Meiki |
| 2014/0021752 A1 | 1/2014 | von Letkemann |
| 2015/0130239 A1 | 5/2015 | Glockl et al. |
| 2015/0164235 A1 | 6/2015 | Zager et al. |
| 2015/0164719 A1 | 6/2015 | Green et al. |
| 2015/0173515 A1 | 6/2015 | Freedman |
| 2015/0250317 A1 | 9/2015 | Glockl |
| 2016/0038780 A1 | 2/2016 | Hugou et al. |
| 2016/0088944 A1 | 3/2016 | Walser |
| 2016/0120326 A1 | 5/2016 | Belleh |

\* cited by examiner

LEANING CHAIR

TECHNICAL FIELD

The present application relates generally to chairs. Specifically, the invention relates to leaning chairs that allow a user to engage his/her core muscles and/or legs to stabilize themselves on the leaning chair.

BACKGROUND

Leaning chairs are known in the art. Leaning chairs can be used to achieve health benefits, for example, by requiring the user to engage his/her core muscles and/or legs to stabilize themselves on the leaning chair. However, known leaning chairs are cumbersome, break down, and/or suffer other drawbacks.

SUMMARY

A leaning chair can include: a base defining a lower surface that rests on a floor, the base including a support surface; a shaft coupled to the base, the shaft defining a first end and a second end; a flexible mount coupling the first end of the shaft to the base, wherein the shaft extends through the mount; a pivot pin located underneath the mount, wherein the first end of the shaft rests on the pivot pin, and is configured to be housed inside the mount, the pivot pin configured to pivot on the support surface; and a user support member coupled to the second end of the shaft.

A mount for pivoting a chair can include: a base defining a lower surface that rests on a floor, the base including a support surface; a shaft coupled to the base, the shaft defining a first and a second end; a flexible mount coupling the first end of the shaft to the base, wherein the shaft extends through the mount; and a mount collar configured to secure the mount to the support surface. The flexible mount can include: a truncated dome shell having an upper portion and a lower portion, wherein a diameter of the upper portion is smaller than a diameter of the lower portion; a lip that protrudes radially from the lower portion of the dome shell; and a cylindrical top on the upper portion.

Additional features, advantages, and embodiments of the invention are set forth or apparent from consideration of the following detailed description, drawings, and claims. Moreover, it is to be understood that both the foregoing summary of the invention and the following detailed description are examples and intended to provide further explanation without limiting the scope of the invention as claimed.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention.

Figure 1:
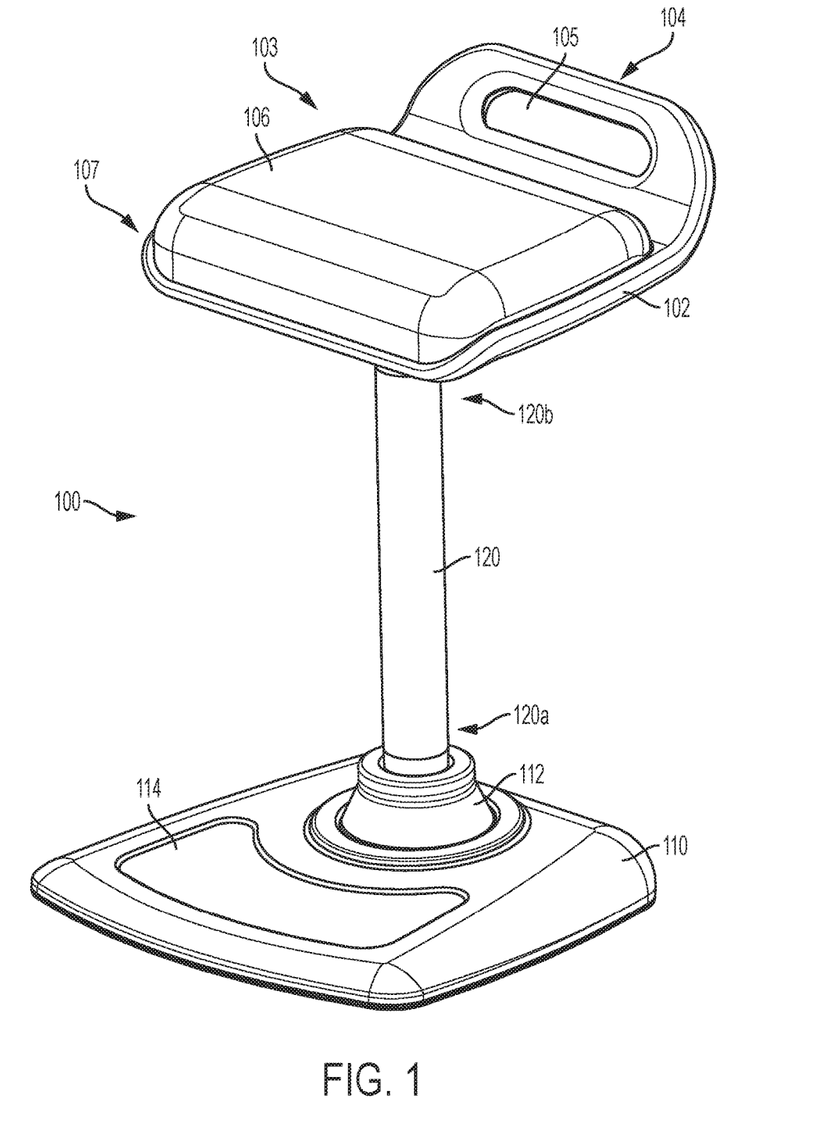
FIG. 1 is a perspective view of a leaning chair, according to an embodiment of the invention.

FIG. 1 depicts an embodiment of a leaning chair 100 according to the present invention. The leaning chair 100 can allow for a user to lean one's lower back or buttocks on a user support member 102, such as a seat. The user support member 102 can be adjustable thus allowing for the user to adjust the height to isolate different groups of muscles. For example, a user can engage his/her core muscles and leg muscles by leaning against the leaning chair 100 for small or long periods of time. The user support member 102 can move with respect to a base 110, requiring the user to extend his/her muscles in order to maintain stability on the leaning chair 100.

FIG. 1 shows that the leaning chair 100 can include a base 110, a shaft 120 extending from the base 110, a mount 112 that couples the shaft 120 to the base 110, and a user support member 102 that is attached to the shaft 120. The leaning chair 100 can further include a seat cushion 106 attached to a top surface of the user support member 102. The shaft 120 can include a first end 120a that connects to the base 110, and a second end 120b that connects to the user support member 102.

As shown in FIG. 1, the base 110 can include a cutout region 114. In an embodiment, the cutout region 114 can be at a front portion of the base and can receive a user's feet. The cutout region 114 can be a relatively shallow cutout in a range of 0.5 mm to 5 mm in relation to the surface of the base 110. A front portion 107 of the user support member 102 can be gradually sloped to comfortably interface with a user's lower back or buttocks. At an opposing end of the front portion 107, the rear portion can be configured to have a handle 104. The handle 104 can be made from a hole 105 cut out of the user support member 102. The handle 104 can protrude upwardly from a top surface of the rear portion 103 of the user support member 102. Other types of handles that allow for a user to grab, stabilize and manipulate the chair are also contemplated within embodiments of the invention. For example, the handle could be bolted on or otherwise attached as a standalone handle. The user support member 102 and base 100 can be made out of plastic while the shaft 120 can be made out of metal; however, other materials are possible.

Figure 2A:
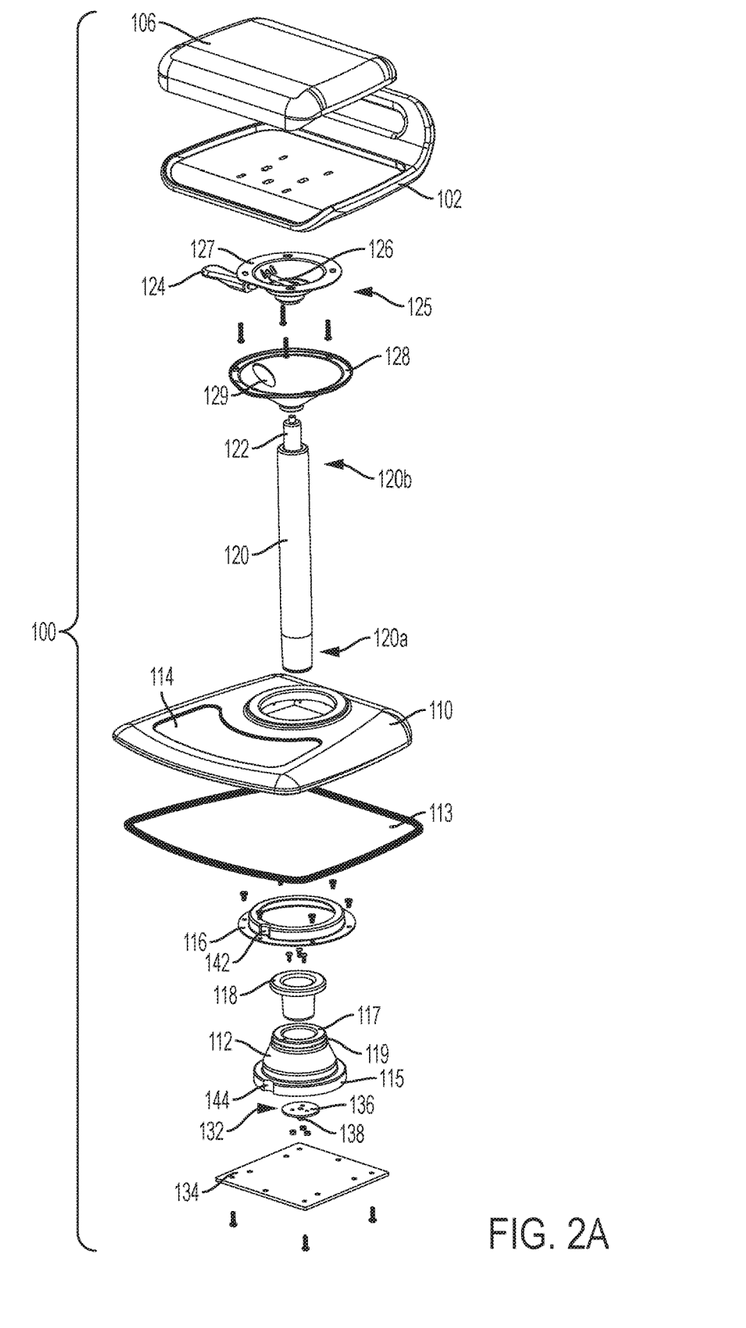
FIG. 2A is an exploded view of the leaning chair of FIG. 1.

The shaft 120 and the user support member 102 can resiliently pivot or flex with respect to the base 110 and, in turn, the surface upon which the base rests. As shown in FIG. 2A, an embodiment of the leaning chair 100 can include a pivot pin 132 configured to rest on a support surface 134 and configured to support the first end 120a of the shaft 120. In an embodiment, the base 110 can include the support surface 134. The support surface 134 can be a metal or plastic plate. The pivot pin 132 can be fastened to the shaft 120 or alternatively, the end of the shaft 120a can rest on the pivot pin 132 under the force of gravity and/or a user's weight.

As mentioned previously, the pivot pin 132 can be configured to distribute weight, for example from a user, into movement of the shaft 120 and user support member 102. An upper portion of the pivot pin 132 can include a head 136 (e.g., a circular planar surface in the embodiment shown)

and a lower portion of the pivot pin can include a tail 138, for example, a cylindrical, conical, or other shaped projection. The pivot pin 132 can have a T-shaped cross-section along a longitudinal axis of the tail 138. As force is applied on the pivot pin 132 via a user resting against the user support member 102, the pivot pin 132 may pivot on support surface 134 until the perimeter of head 136 makes contact with the support surface 134. Thus, as force is applied in a generally circular motion to the user support member 102, the pivot pin 132 can pivot on the support surface 134 in that same circular direction. Thus, the range of motion of the shaft 120 and user support member 102 can be directly related to the diameter of the head 136 and/or the length of the tail 138. That is, the longer the tail 138 and/or the smaller the diameter of the head 136 of the pivot pin 132, the more range of motion the shaft 120 can have.

The mount 112 can comprise a resilient member that provides for controlled pivoting of the shaft 120 and user support member 102, according to an embodiment of the invention. For example, according to embodiments, the mount 112 can act as a damper that controls the pivoting of the shaft 120 with respect to the support surface 134. The mount 112 can be made of rubber, plastic, gel, or other resilient material. The mount material can have a hardness of 80 Shore A and can be made of silicone, for example in some embodiments. The mount 112 can be an external mount where at least a portion of the mount that interfaces with the shaft 120 is external to the base 110 and shaft 120. The mount 112 can be in a shape of a truncated dome shell; however, other embodiments are possible. The mount 112 can be substantially in the shape of a dome having a flattened top. A diameter of the upper portion of the mount 112 thus can be smaller than a diameter of a lower portion. The mount 112 can have a lip 115 extending radially from a lower portion of the mount 112, which can aid in securing the mount 112 to the support surface 134. The mount 112 can define a hollow interior or alternatively can define a through bore that receives the shaft 120. A mount collar 116 can be used to secure the mount 112 to the support surface 134, for example, using screws or other fasteners. The mount collar 116 can have a groove 142 that extends along a longitudinal axis of the mount 112. The mount 112 can have a corresponding groove 144 in lip 115 that engages groove 142 such that the mount collar 116 can hold the mount 112 in a predetermined radial orientation on the support surface 134.

The mount 112 can include a cylindrical top 117 on the upper portion. The cylindrical top 117 can include at least one radial channel 119 on an exterior surface of the cylindrical top 117. The cylindrical top 117 of the mount 112 can interface with a shaft cup 118. For example, the shaft cup can extend into the upper portion of the mount 112, and the upper portion of the shaft cup 118 can rest on the top 117 of the mount 112. This can allow the shaft cup 118 to rest on the upper surface of the mount 112 without sliding down into the mount 112. The shaft cup 118 can provide an interface between the mount 112 and the shaft 120. The shaft cup can be made of any durable material and can also be of a slightly flexible material. The shaft cup 118 can be secured to the mount 112 via a press fit, or alternatively, can be secured to the mount 112 via adhesive or fasteners. A slide-proof piece 113 is shown in FIG. 2A directly underneath the base 110. The slide-proof piece 113 can provide skid resistance and protect the floor surface. The slide-proof piece 113 can be made of PVC material or other durable material that does not damage floors.

As discussed above, the leaning chair 100 can include a mount collar 116 that is configured to surround and engage at least a portion of the mount 112, for example, the lip 115. The mount collar 116 can used to stabilize the rubber mount 112 in the face of pressure or lateral movement of the shaft 120. The user support member 102 can interface with a linkage mechanism 126. In an embodiment, an interface or bracket 127 can be a circular attachment that is part of a height adjustment device 125 that will be described in more detail below.

FIG. 2A shows an exploded view of the seat cushion 106 and user support member 102. The seat cushion 106 can include a resilient exterior housing material such as leather, fabric, vinyl, or combinations thereof. The seat cushion 106 exterior material can house a padding, for example cushioned padding, that allows for a comfortable leaning interface for the user.

Figure 2B:
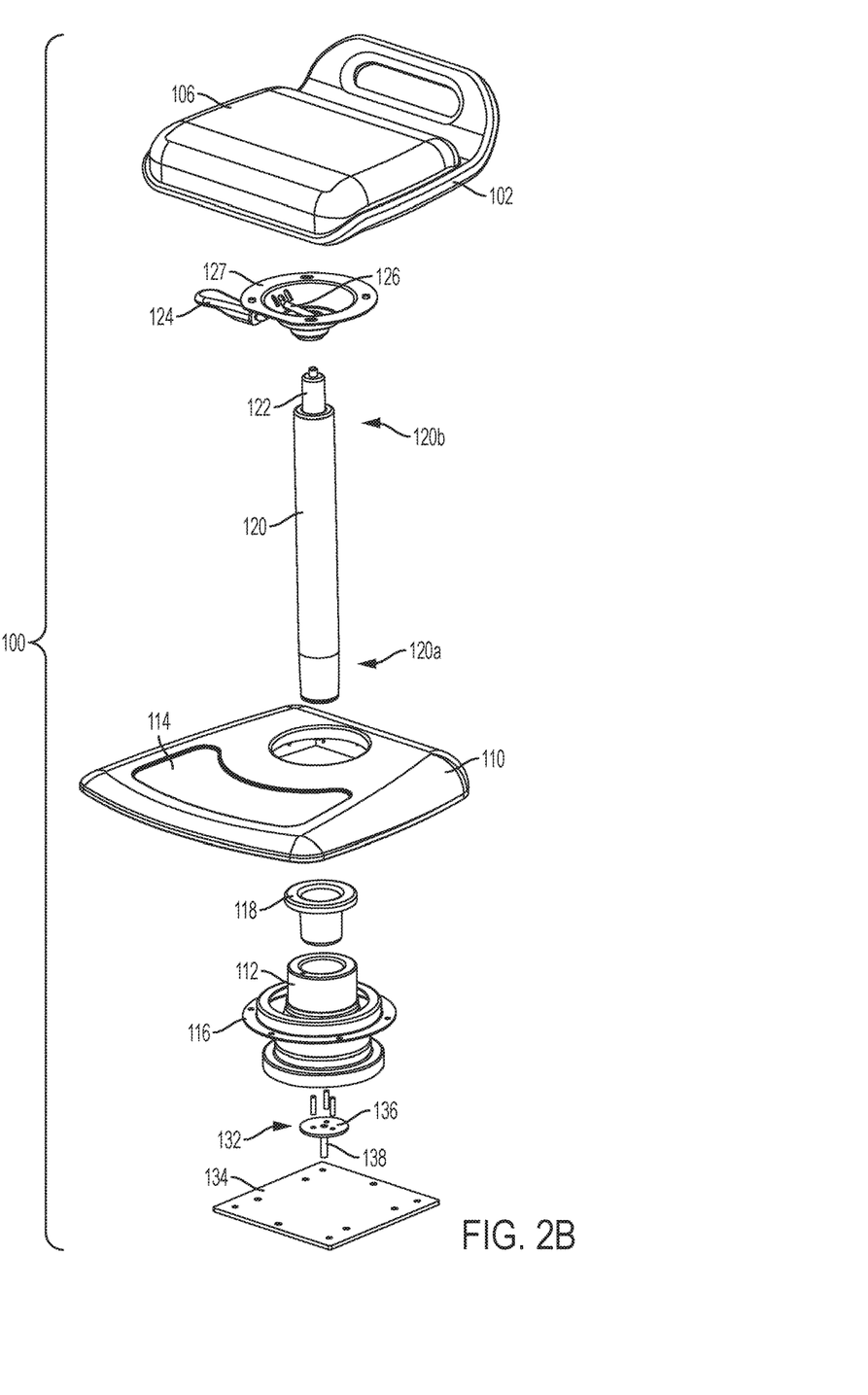
FIG. 2B is an exploded view of a leaning chair, according to another embodiment of the invention.

FIG. 2B shows an exploded view of the leaning chair 100 according to an alternative embodiment of the invention that is substantially the same as the embodiment of FIG. 2A, but the tail 138 can be longer than the tail 138 of FIG. 2A. As discussed above, the longer the tail 138 and/or the smaller the diameter of the head 136 of the pivot pin 132, the more range of motion the shaft 120 can have. As seen from FIG. 2B, the mount 112 can have a more cylindrical upper portion in comparison with the more dome-shaped upper portion of the mount 112 of FIG. 2A. FIG. 2B shows the seat cushion 106 attached to the user support member 102. The more cylindrical upper portion of the mount 112 of FIG. 2B can provide additional coverage around the shaft 120, which can provide additional resistance for radial movement of the shaft.

Figure 9:
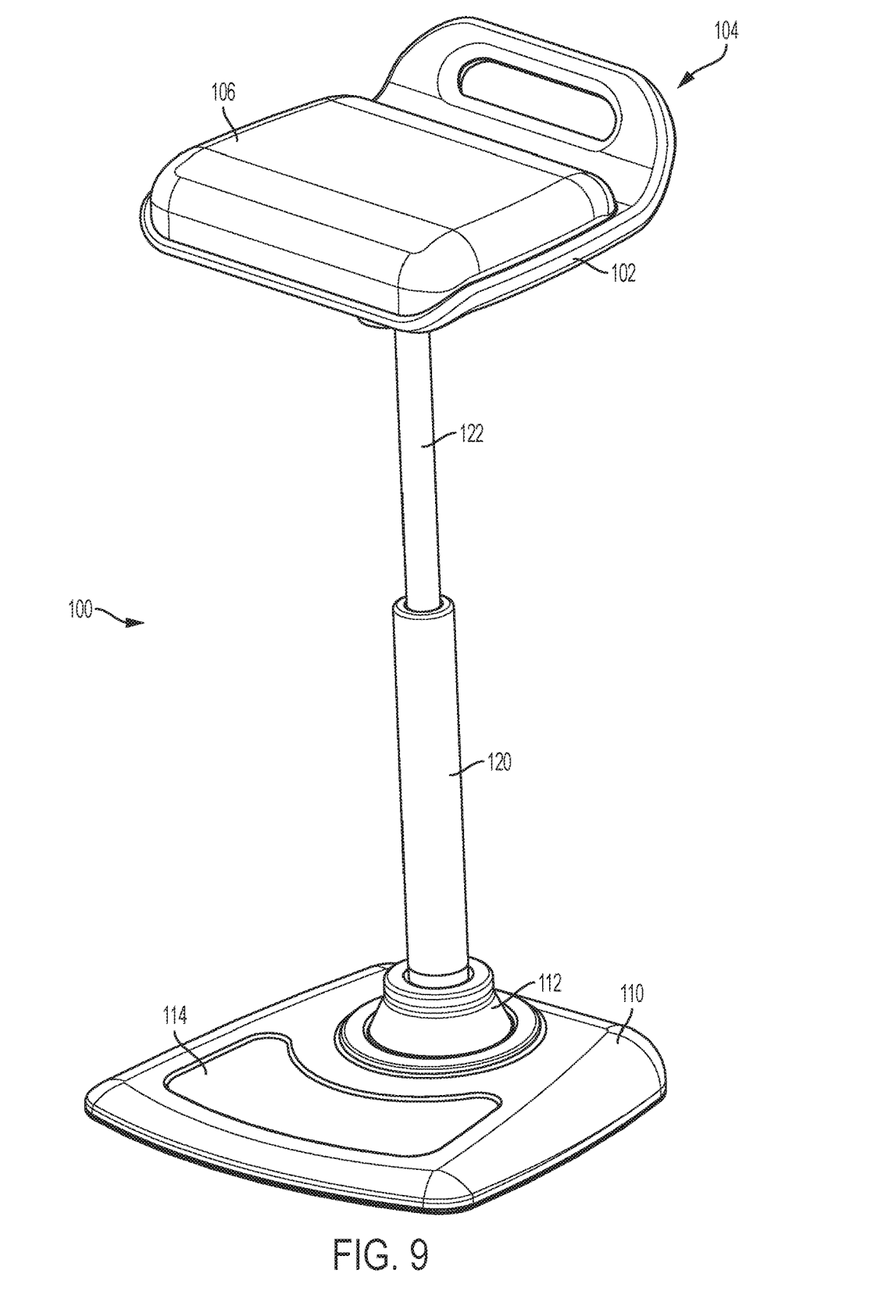
FIG. 9 is a perspective view of the leaning chair of FIG. 1, shown in a raised position.

As shown by contrasting FIGS. 1 and 9, the leaning chair 100 can include an adjustment device 125 that is configured to raise or lower the user support member 102 in relation to the base 110. For example, referring to FIG. 2A, the shaft 120 can comprise a telescopic shaft 120 having an inner member 122 that slides within the outer portion of shaft 120 to adjust the overall distance between the first end 120a and second end 120b of the shaft 120. The shaft 120 can be biased in an extended direction using a coil spring, gas spring, or other member located in shaft 120. The adjustment device 125 can include a handle 124 and a linkage mechanism 126 that interfaces with a braking mechanism (not shown) within the shaft 120 to releasably lock the user support member 102 at a desired height. A bracket 127 can support and guide movement of the linkage mechanism 126 and/or handle 124. The linkage mechanism 126 can be mounted on an underside of the user support member 102. For example, pressing the handle 124 out of the locked position can move the linkage mechanism 126 to unlock the braking mechanism to facilitate movement of the shaft 120 up or down.

In an embodiment, at least a portion of the shaft 120 (for example an interior telescoping shaft 122 as shown in FIGS. 1 and 9) can be biased upwards such that when the handle 124 releases the shaft out of the locked position, the user support member 102 raises unless sufficient pressure (e.g., the weight of the user) is exerted in the downward direction. In other embodiments, the shaft can be configured to lower upon being released unless pressure is exerted (e.g., the user pulling the user support member) upward. The leaning chair 100 can include a cone-shaped flange 128 extending over portions of the adjustment device 125. The flange 128 can outline a hole 129 through which the handle 124 of the adjustment device 125 can extend outward.

Various components of the leaning chair 100, such as the shaft cup 118, linkage mechanism 126, user support member 102, base 110, mount 112, adjustment device 125, cone-shaped flange 128 and/or support surface 134 can be formed of metal or plastic and can be configured to be assembled or mounted to other components using screws, fasteners, or any other type of fasteners known in the art, including adhesives. FIGS. 2A and 2B show the use of fasteners to assemble many of the components.

Referring to FIG. 1, a user can perch against a front portion 107 of the user support member 102. The front portion 107 can have a soft edge that is gradually sloped from a planar surface to the edge. The soft edge allows for maximum comfort of the user while leaning against the leaning chair. The seat cushion 106 can allow for further comfort of the user as the front portion 107 of the user support member 102 can be supplemented with a soft and stable cushion. The user can place one or both feet on the base 110 for additional stability of the leaning chair. Alternatively, the user can place his/her feet on the floor in front of base 110. The seat cushion 106 can be made of a variety of padded materials. These padded materials can be soft, but durable, allowing the user some degree of cushion and stability. The flexibility and resiliency of the shaft 120 and/or the flexibility of the mount 112 can allow for a user to push against the leaning chair 100. For example, the user can be in a slightly squatted position while leaning against the user support member 102, which can allow the user to exert the user's leg muscles and core muscles to maintain stability of the user. The shaft 120 can be biased to return a reciprocating force to the user, thus requiring the user's sustained energy to keep the leaning chair in the pushed position. Continually pushing backward and maintaining the user support member 102 in a biased position can require flexing of, and/or can exert, the core and/or leg muscles of the user.

Figure 3:
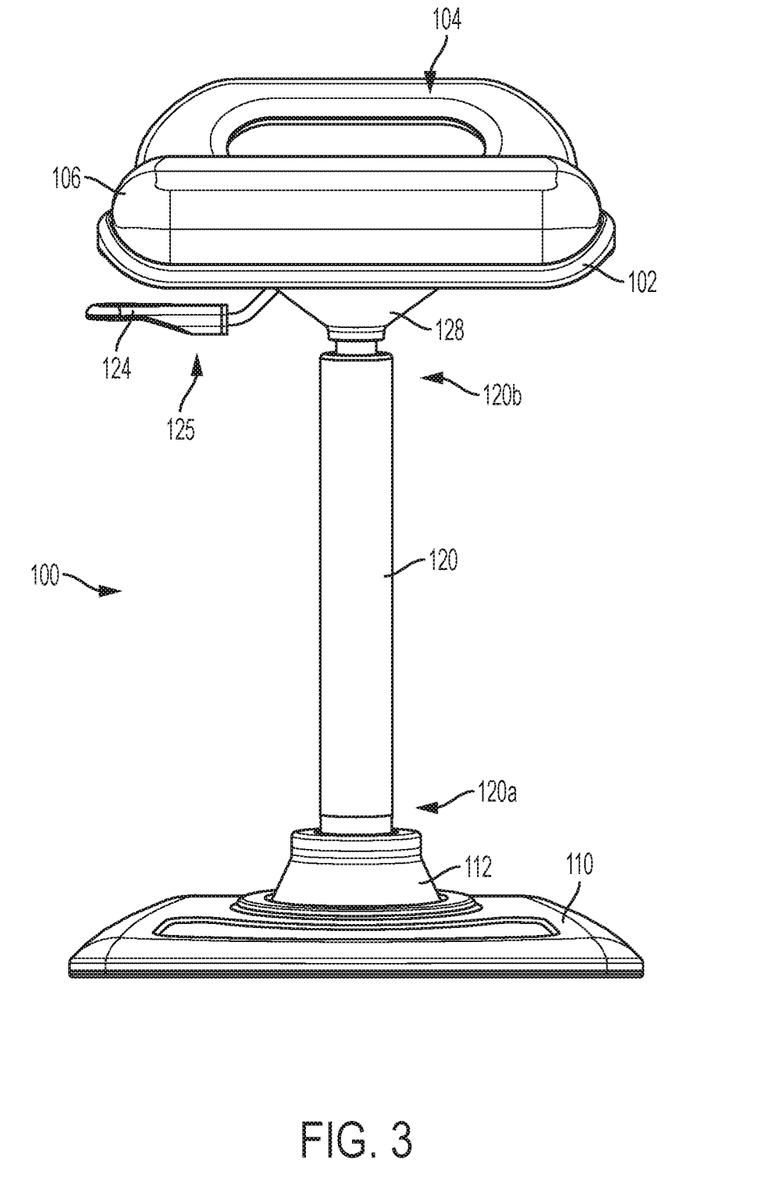
FIG. 3 is a front view of the leaning chair of FIG. 1.
Figure 4:
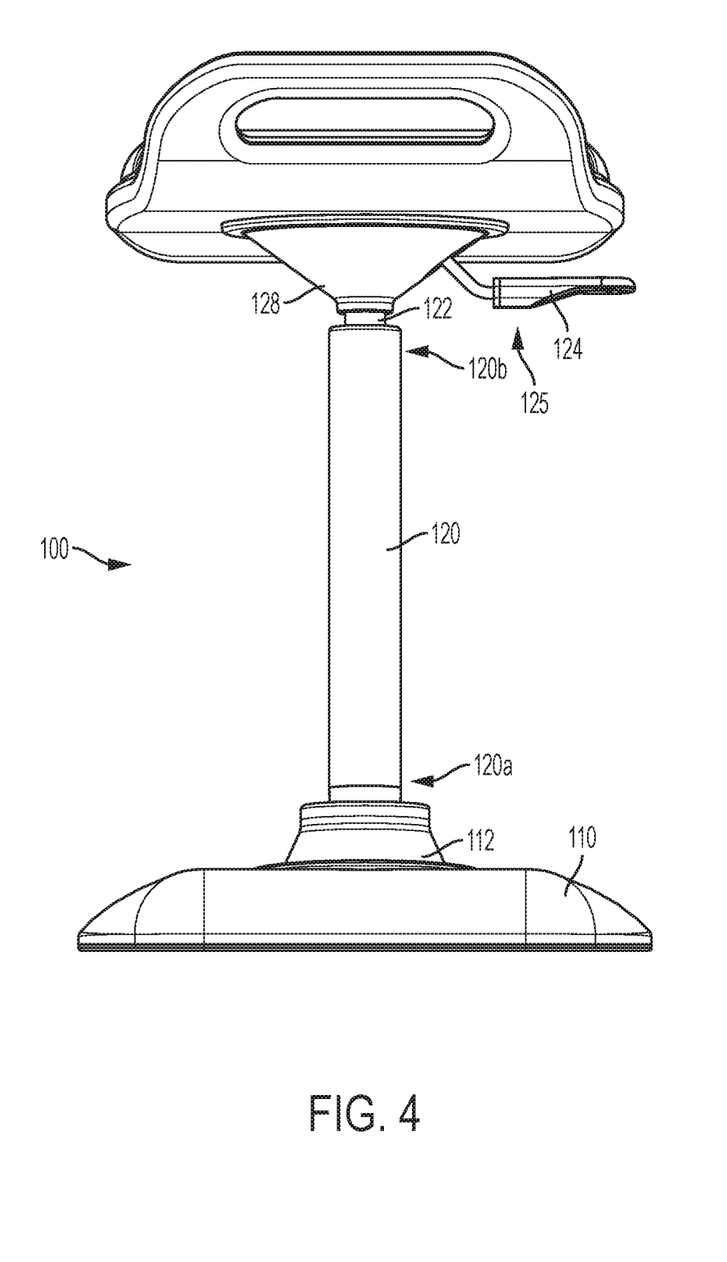
FIG. 4 is a rear view of the leaning chair of FIG. 1.

FIGS. 3 and 4 illustrate front and rear facing perspectives of the leaning chair 100, respectively.

Figure 5:
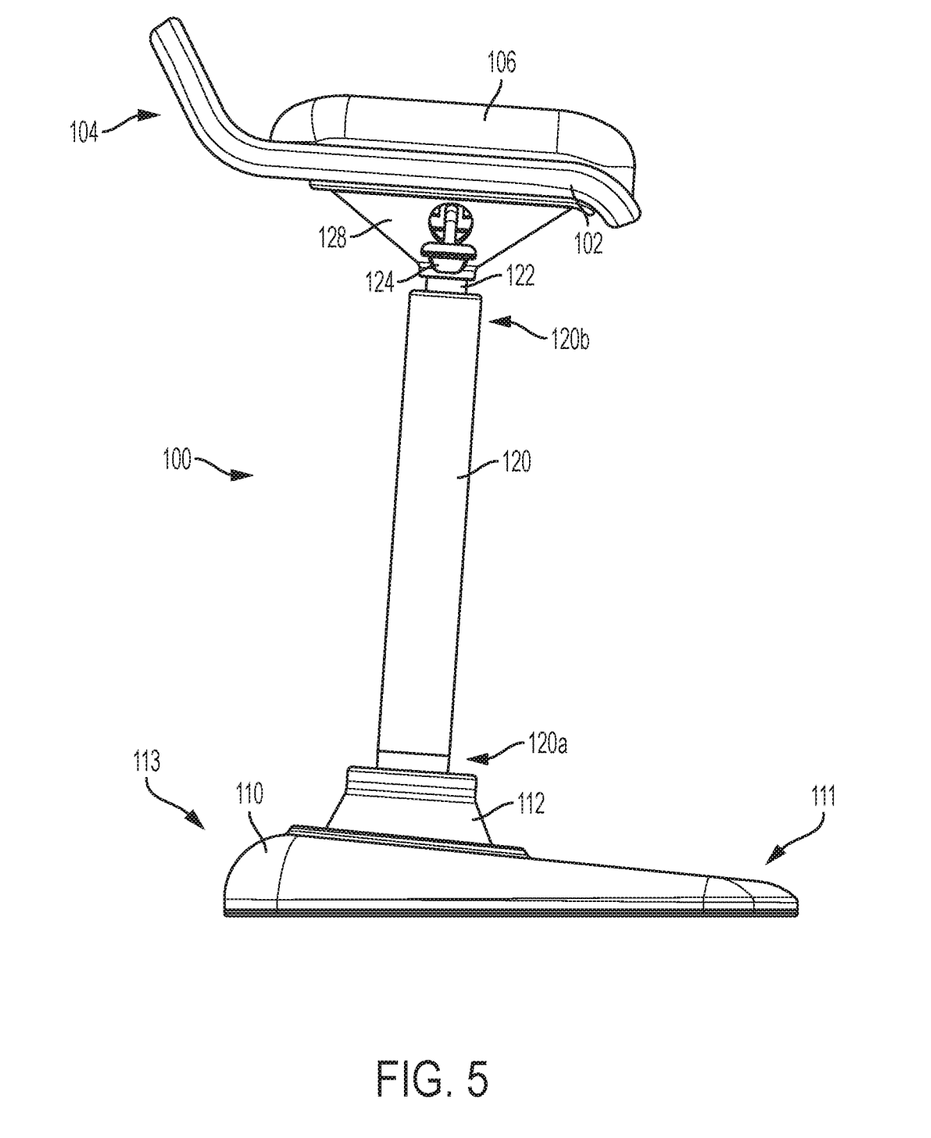
FIG. 5 is a side view of the leaning chair of FIG. 1.

FIG. 5 shows the handle 124 of the adjustment device 125 extending through the hole 129 through the flange 128. As can be seen, the shaft 120 and user support member 102 can by default be positioned at a slight forward angle related to a lower surface of the base 110. Based on this positioning, and based on the user support member being positioned closer to the rear portion of the base than the front portion of the base 110, the leaning chair 100 can be configured to allow a user to rest his/her feet on the front portion 111 of the base. This can allow for the leaning chair to stabilize against leaning pressure that would otherwise tip over the leaning chair 100. Alternatively, the user can place his/her feet on the floor in front of the base 110.

Figure 6:
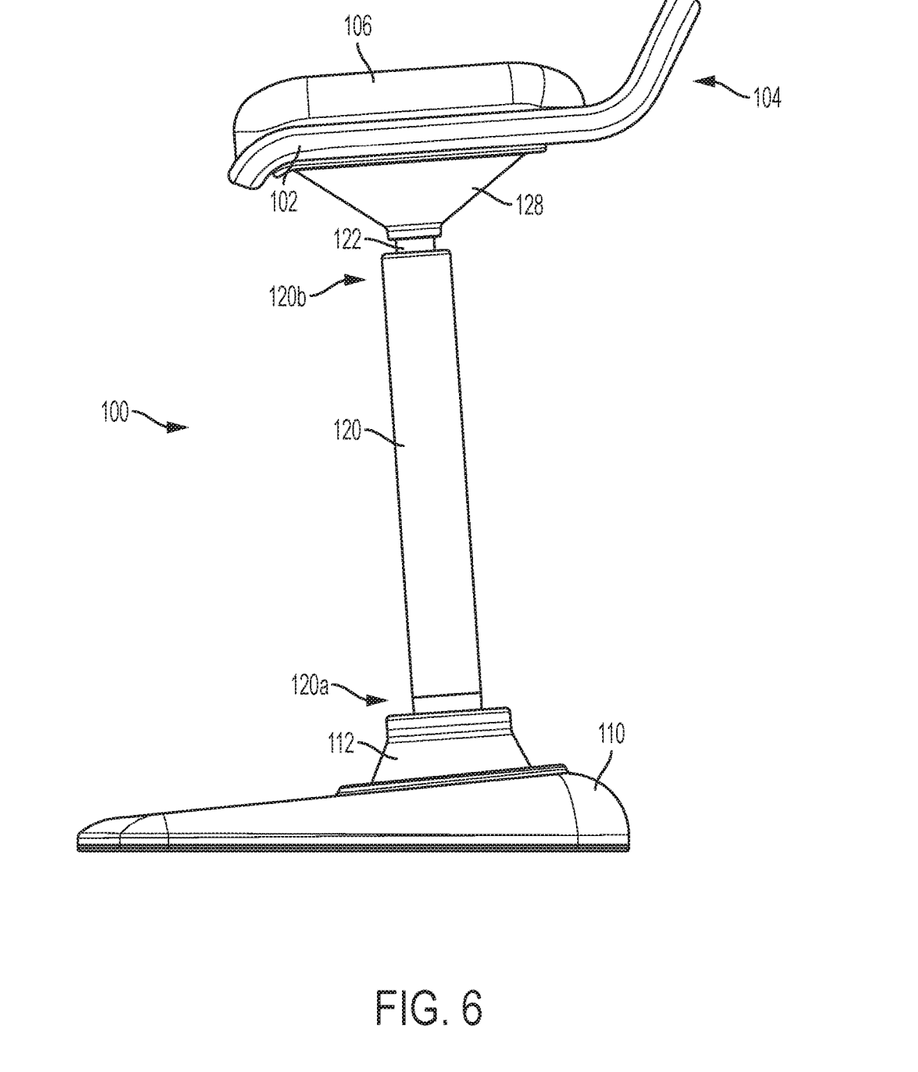
FIG. 6 is an opposing side view of FIG. 5.

FIG. 6 shows a side profile of the leaning chair 100. As can be seen, the user support member 102 can be a low back seat, where a back surface in the form of a seat handle 104 can extend upward from the planar surface of the user support member 102 in a range of one to five inches. In other embodiments the seat handle 104 can extend more or less than the range of one to five inches. In still other embodiments, the user support member 102 may not have a seat handle 104 at all.

Figure 7:
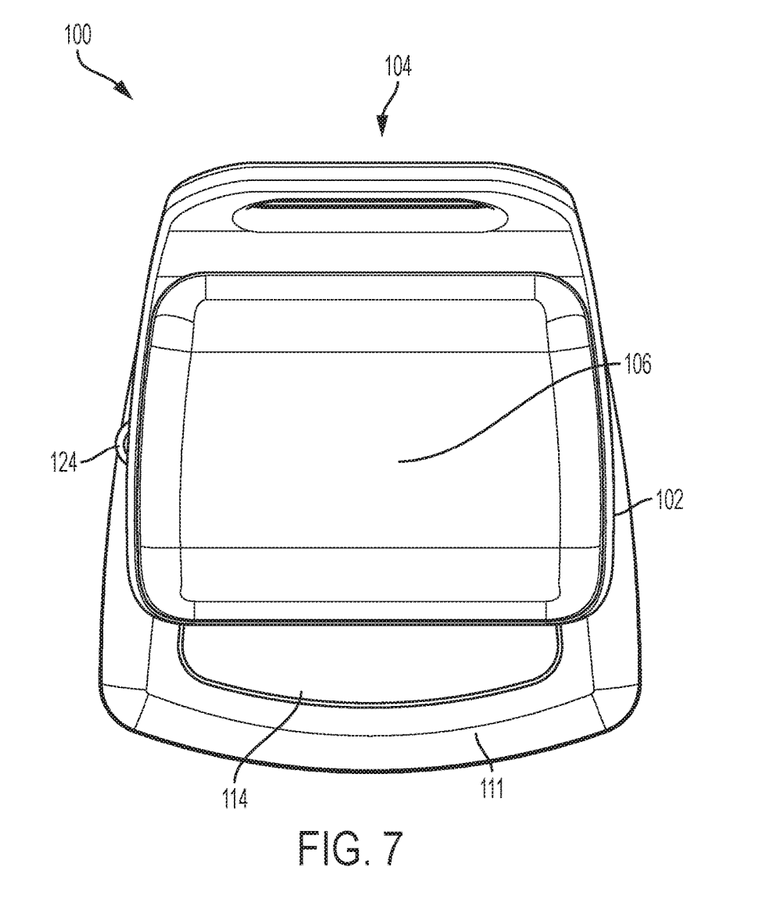
FIG. 7 is a top view of the leaning chair of FIG. 1.

FIG. 7 shows a top view of the leaning chair 100. As can be seen, the user support member 102 can be positioned substantially in the center of the base 110, thus allowing a user, in use, to apply his/her own weight onto the base 110, for example, by applying the feet to front portion 111. Note, however, the user can also stand on the floor or front of the base 110 and lean rearward towards the user support member 102 with his or her buttocks.

Figure 8:
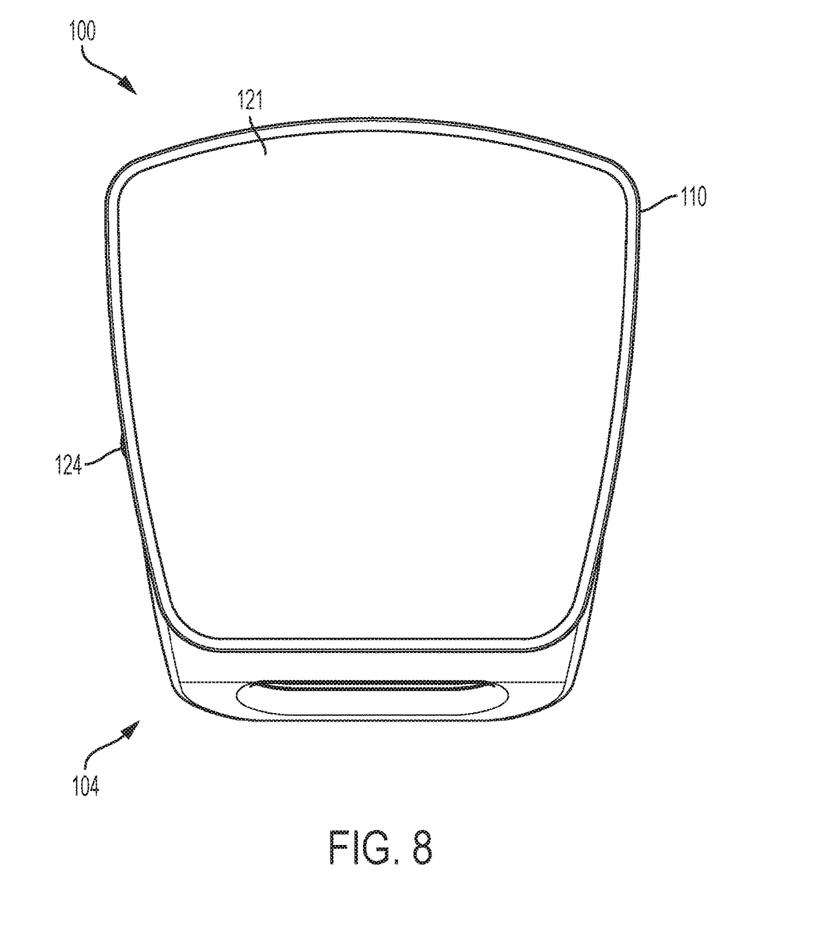
FIG. 8 is a bottom view of the leaning chair of FIG. 1.

FIG. 8 shows a bottom view of the leaning chair 100. As can be seen, the base 110 can comprise a substantial portion of the area of the leaning chair to ensure stability of the leaning chair 100. A bottom surface 121 can be shaped and configured to rest stably on a floor, for example, can be substantially planar or can include various textures. In some embodiments, weights can be added to, in, or on the base for added stability.

FIG. 9 shows the leaning chair 100 in a raised state. In an embodiment as shown in FIG. 9, the shaft 120 can telescope in an expanded and raised state, revealing an inner telescopic member 122. The shaft 120 having the inner telescopic member 122 results in an increased height of the leaning chair 100. The shaft 120 can include a coil spring or a hydraulic mechanism and/or gas spring to allow for the user support member 102 to slide upward or downward with less effort by the user. One of ordinary skill in the art will appreciate that other techniques and devices that allow for the shaft 120 to raise in relation to the base 110 are possible in view of the present description.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

Although the foregoing description is directed to some embodiments of the invention, it is noted that other variations and modifications will be apparent to those skilled in the art based on the present disclosure, and may be made without departing from the spirit or scope of the invention. Moreover, features described in connection with one embodiment of the invention may be used in conjunction with other embodiments, even if not explicitly stated above.

What is claimed is:

1. A leaning chair, comprising:
    a base defining a lower surface that rests on a floor, the base including a support surface;
    a shaft coupled to the base, the shaft defining a first end and a second end;
    a flexible mount coupling the first end of the shaft to the base, wherein the shaft extends through the mount;
    a pivot pin located underneath the mount, wherein the first end of the shaft rests on a planar surface of the pivot pin, and is configured to be housed inside the mount, the pivot pin configured to pivot on the support surface; and
    a user support member coupled to the second end of the shaft.

2. The leaning chair of claim 1, wherein at least a portion of the mount extends from within the base to an area outside of the base.

3. The leaning chair of claim 1, wherein the base comprises the support surface.

4. The leaning chair of claim 1, wherein the mount is connected to the support surface.

5. The leaning chair of claim 4, further comprising a mount collar configured to secure the mount to the support surface.

6. The leaning chair of claim 1, further comprising a shaft cup disposed at least partially in the mount and configured to receive the first end of the shaft, wherein an upper portion of the shaft cup is configured to rest on the mount.

7. The leaning chair of claim 1, wherein the pivot pin has a head portion and a tail portion extending substantially perpendicularly from the head portion, whereby the pivot pin defines a substantially T-shaped transverse cross section.

8. The leaning chair of claim 1, further comprising:
a handle located on a rear portion of the user support member.

9. The leaning chair of claim 1, wherein the mount is formed of a resilient material.

10. The leaning chair of claim 9, wherein the mount comprises rubber.

11. The leaning chair of claim 1, further comprising a cushion attached to the user support member.

12. The leaning chair of claim 1, further comprising an adjustment device that is configured to raise or lower the user support member in relation to the base.

13. The leaning chair of claim 12, wherein the shaft comprises a telescoping shaft.

14. The leaning chair of claim 13, wherein the shaft comprises at least one of a coil spring or gas spring.

15. The leaning chair of claim 13, further comprising:
a user-operable handle; and
a linkage mechanism coupling the handle to the telescoping shaft,
wherein the handle is user-operable to adjust the height of the user support member with respect to the base.

16. The leaning chair of claim 1, wherein lateral force against the user support member causes the pivot pin to pivot about the support surface.

17. A mount for pivoting a chair, the mount comprising:
a base defining a lower surface that rests on a floor, the base including a support surface;
a shaft coupled to the base, the shaft defining a first and a second end;
a flexible mount coupling the first end of the shaft to the base, wherein the shaft extends through the mount; and
a mount collar configured to secure the mount to the support surface,
wherein the flexible mount comprises:
a truncated dome shell having an upper portion and a lower portion, wherein a diameter of the upper portion is smaller than a diameter of the lower portion;
a lip that protrudes radially from the lower portion of the dome shell, the lip resting on the support surface; and
a cylindrical top on the upper portion.

18. The mount of claim 17, further comprising a shaft cup disposed at least partially in the mount and configured to receive the first end of the shaft, wherein an upper portion of the shaft cup is configured to rest on the mount.

19. The mount of claim 17, wherein the mount is formed of a resilient material.

20. The mount of claim 17, wherein the mount collar comprises a groove that corresponds in location and shape to a groove of the mount.

21. The mount of claim 17, wherein the lip rests directly on the support surface.

22. The mount of claim 17, the lip further comprising a groove.

23. The leaning chair of claim 1, wherein the planar surface is a circular planar surface and wherein the pivot pin is configured to pivot on the support surface with a tail of the pivot pin that rests on the support surface.

24. The leaning chair of claim 1, wherein the planar surface is a circular planar surface and wherein the pivot pin further comprises a tail extending from the circular planar surface.

25. A leaning chair, comprising:
a base defining a lower surface that rests on a floor, the base including a support surface;
a shaft coupled to the base, the shaft defining a first end and a second end;
a flexible mount coupling the first end of the shaft to the base, wherein the shaft extends through the mount;
a pivot pin located underneath the mount, wherein the first end of the shaft rests on the pivot pin, and is configured to be housed inside the mount, the pivot pin configured to pivot on the support surface;
a shaft cup disposed at least partially in the mount and configured to receive the first end of the shaft, wherein an upper portion of the shaft cup is configured to rest on the mount; and
a user support member coupled to the second end of the shaft.

* * * * *